United States Patent
Kajikawa et al.

(10) Patent No.: US 12,518,727 B2
(45) Date of Patent: Jan. 6, 2026

(54) INPUT INTERFACE DEVICE, ELECTRONIC MUSICAL INSTRUMENT, LIGHT EMISSION CONTROL METHOD AND STORAGE MEDIUM

(71) Applicant: CASIO COMPUTER CO., LTD., Tokyo (JP)

(72) Inventors: Tomoya Kajikawa, Tokyo (JP); Shingo Okano, Akiruno (JP); Osamu Moriyama, Ome (JP); Ken Terao, Iruma (JP); Shinichi Moritani, Kawasaki (JP); Yutaro Ichimura, Yokohama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 273 days.

(21) Appl. No.: 18/199,439

(22) Filed: May 19, 2023

(65) Prior Publication Data

US 2023/0410775 A1 Dec. 21, 2023

(30) Foreign Application Priority Data

Jun. 17, 2022 (JP) .................................. 2022-097682

(51) Int. Cl.
*G10H 1/00* (2006.01)
*G10H 1/34* (2006.01)

(52) U.S. Cl.
CPC .............. *G10H 1/0016* (2013.01); *G10H 1/34* (2013.01)

(58) Field of Classification Search
CPC ............................... G10H 1/0016; G10H 1/34
See application file for complete search history.

(56) References Cited

U.S. PATENT DOCUMENTS

| | | | | |
|---|---|---|---|---|
| 7,210,618 B2 * | 5/2007 | Dong | .................... | G06F 3/0233 345/566 |
| 2007/0152977 A1 * | 7/2007 | Ng | ..................... | G06F 3/03547 345/173 |

(Continued)

FOREIGN PATENT DOCUMENTS

| EP | 3093751 A1 | 11/2016 |
|---|---|---|
| JP | H10268862 A | 10/1998 |

(Continued)

OTHER PUBLICATIONS

Extended European Search Report (EESR) dated Dec. 15, 2023, issued in counterpart European Application No. 23178216.0.

(Continued)

*Primary Examiner* — Robert W Horn
(74) *Attorney, Agent, or Firm* — Holtz, Holtz & Volek PC

(57) ABSTRACT

An input interface device includes at least one processor. The processor performs control to cause, among light emitters, a first light emitter corresponding to a contact/proximity point detected by a detector to emit light with a luminous intensity higher than that of a remaining light emitter. The contact/proximity point is where an object is in contact with or in proximity to a detection surface. The processor further performs control, while the object is moving along the light emitters in a state in which the object is in contact with or in proximity to the detection surface, to gradually reduce a luminous intensity of, among the light emitters, a second light emitter corresponding to a point where the object being in contact with or in proximity to the detection surface once detected by the detector is no longer detected to put out the second light emitter in a predetermined time.

20 Claims, 8 Drawing Sheets

(56) References Cited

U.S. PATENT DOCUMENTS

| | | | |
|---|---|---|---|
| 2008/0084398 A1* | 4/2008 | Ito | H04N 23/62 345/173 |
| 2009/0090568 A1* | 4/2009 | Min | G06F 3/03547 178/18.06 |
| 2010/0033426 A1 | 2/2010 | Grant et al. | |
| 2012/0206392 A1* | 8/2012 | Ng | G06F 3/0416 345/173 |
| 2016/0334911 A1 | 11/2016 | Kimura | |
| 2023/0410772 A1* | 12/2023 | Kajikawa | G06F 3/0482 |
| 2023/0410773 A1* | 12/2023 | Okano | G10H 1/0008 |
| 2023/0410775 A1* | 12/2023 | Kajikawa | G10H 1/34 |

FOREIGN PATENT DOCUMENTS

| | | |
|---|---|---|
| JP | 2008544361 A | 12/2008 |
| JP | 2016080851 A | 5/2016 |
| JP | 2016212769 A | 12/2016 |
| JP | 2019200916 A | 11/2019 |
| JP | 2020204868 A | 12/2020 |

OTHER PUBLICATIONS

Japanese Office Action (and an English language translation thereof) dated Jun. 4, 2024, issued in counterpart Japanese Application No. 2022-097682.

* cited by examiner

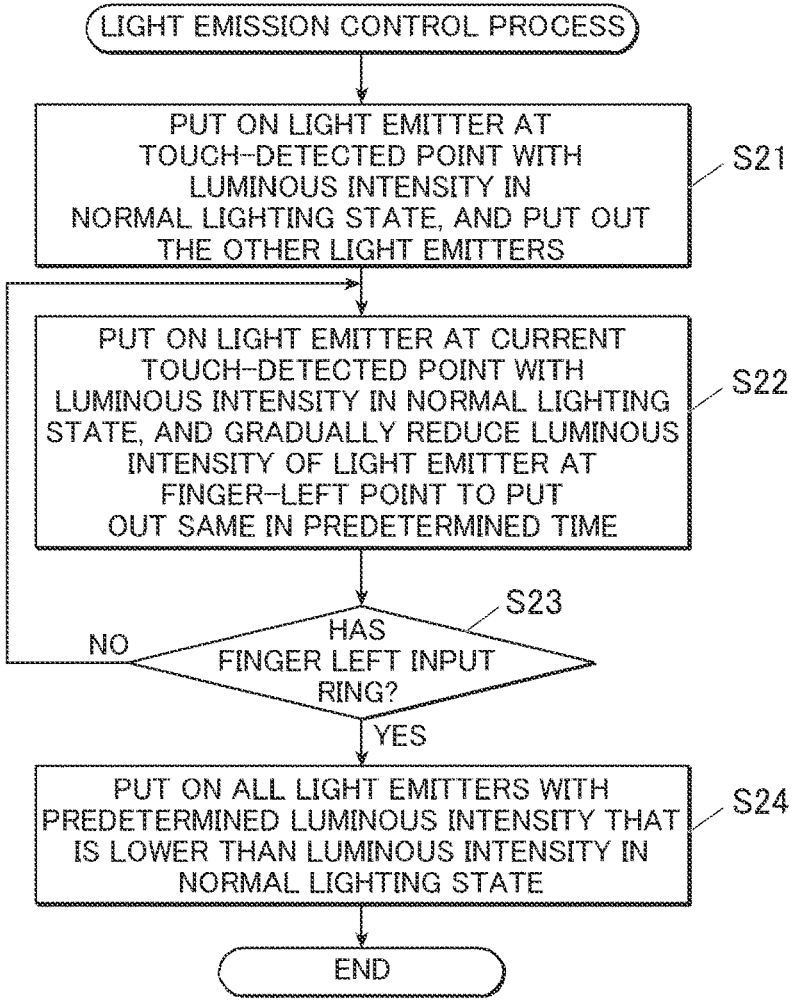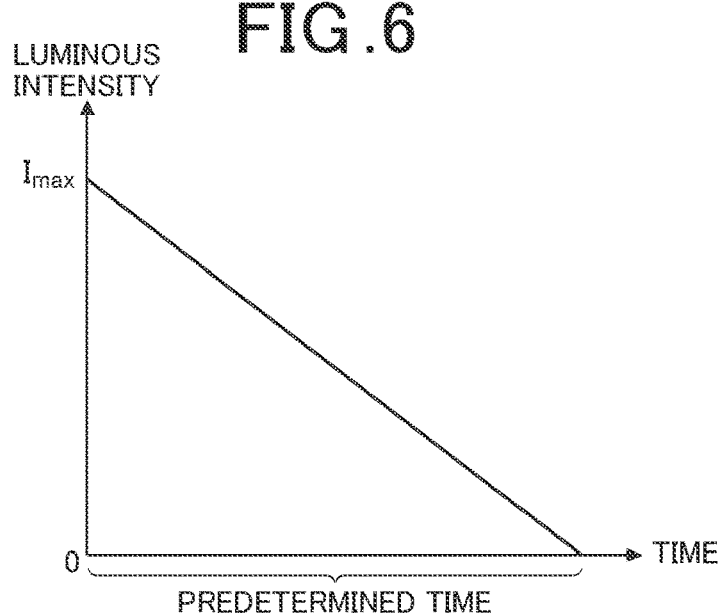

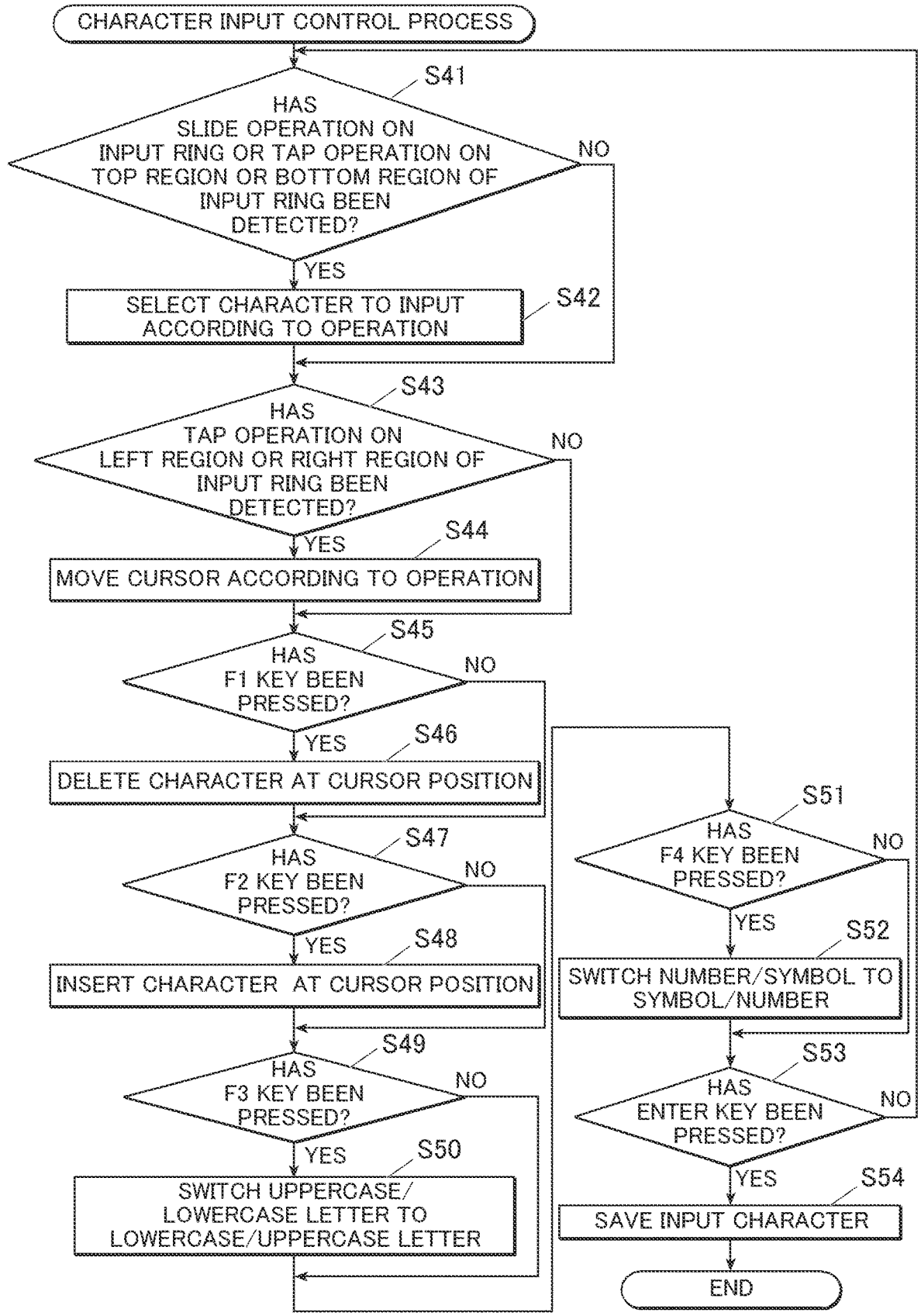

INPUT INTERFACE DEVICE, ELECTRONIC MUSICAL INSTRUMENT, LIGHT EMISSION CONTROL METHOD AND STORAGE MEDIUM

REFERENCE TO RELATED APPLICATIONS

This application is based upon and claims the benefit of priority from the prior Japanese Patent Application No. 2022-097682, filed on Jun. 17, 2022, the entire contents of which are incorporated herein by reference.

TECHNICAL FIELD

The present disclosure relates to an input interface device, an electronic musical instrument, a light emission control method and a storage medium.

DESCRIPTION OF RELATED ART

There has been known making operations, for example, to move a cursor displayed on a screen using an input interface, such as a physical button or dial or a capacitive touchscreen. For example, in JP 2020-204868 A, there is disclosed a display apparatus capable of causing a light source at a position corresponding to a finger being slid on a slide operation section to emit light and also scrolling item images on a scroll image section.

SUMMARY OF THE INVENTION

According to an aspect of the present disclosure, there is provided an input interface device including:
- a detector having a detection surface and detecting that an object is in contact with or in proximity to the detection surface;
- a plurality of light emitters disposed alongside at positions corresponding to the detector and making the detection surface light up; and
- at least one processor that
  - performs control to cause, among the plurality of light emitters, a first light emitter corresponding to a contact or proximity point at which the object is in contact with or in proximity to the detection surface and that is detected by the detector to emit light with a luminous intensity that is higher than a luminous intensity of a remaining light emitter, and
  - while the object is moving along the plurality of light emitters in a state in which the object is in contact with or in proximity to the detection surface, performs control to gradually reduce a luminous intensity of, among the plurality of light emitters, a second light emitter corresponding to a point at which the object being in contact with or in proximity to the detection surface once detected by the detector is no longer detected to put out the second light emitter in a predetermined time.

BRIEF DESCRIPTION OF DRAWINGS

The accompanying drawings are not intended as a definition of the limits of the present disclosure but illustrate embodiments of the present disclosure, and together with the general description given above and the detailed description of the embodiments given below, serve to explain the principles of the present disclosure, wherein:

FIG. 5 is a flowchart of a light emission control process that is performed by the CPU shown in FIG. 1;

FIG. 6 is a graph showing change in luminous intensity of a light emitter at a position where contact or proximity of a finger with or to the input ring has been detected and is no longer detected;

FIG. 13 is a flowchart of a character input control process that is performed by the CPU shown in FIG. 1.

DETAILED DESCRIPTION

Hereinafter, one or more embodiments of the present disclosure will be described with reference to the drawings. Although various limitations technically preferable for carrying out the present disclosure are put on the embodiment(s) described below, the technical scope of the present disclosure is not limited to the embodiment(s) below or illustrated examples.

[Configuration of Electronic Musical Instrument 100]

Figure 1:
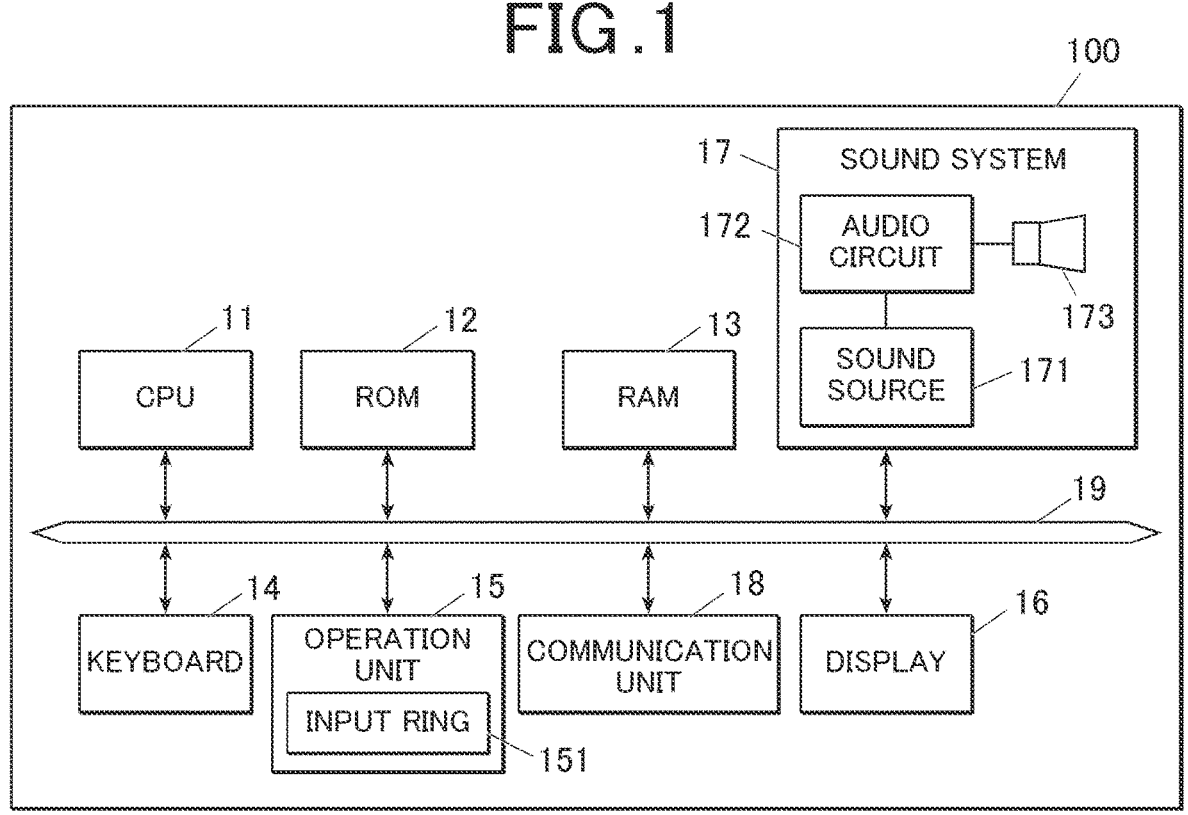
FIG. 1 is a block diagram showing a functional configuration of an electronic musical instrument including an input interface device of the present disclosure.
Figure 2:
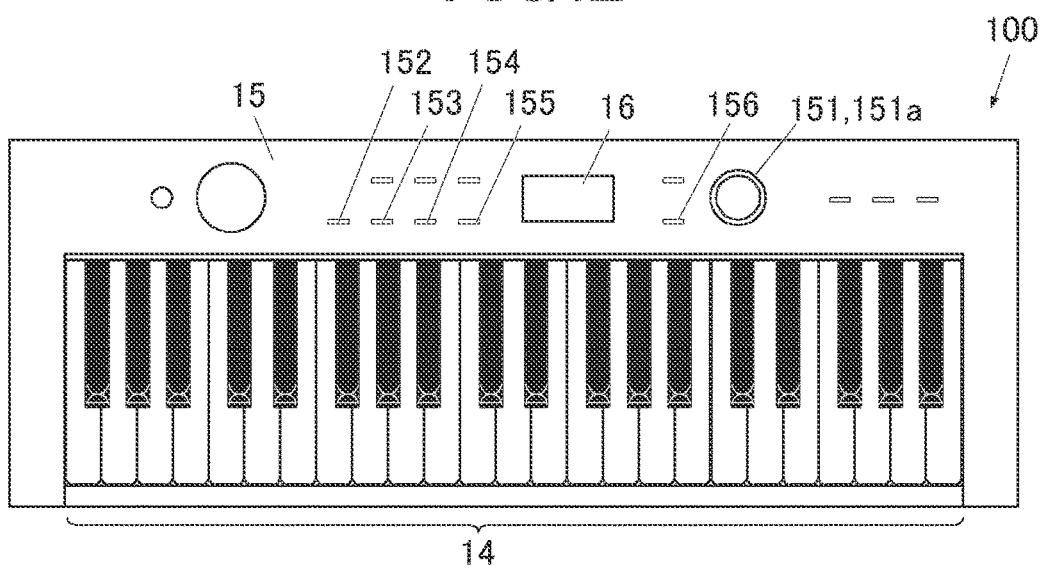
FIG. 2 shows an example of the external configuration of the electronic musical instrument including the input interface device of the present disclosure.

FIG. 1 is a block diagram showing a functional configuration of an electronic musical instrument 100 including an input interface device of the present disclosure. FIG. 2 shows an example of the external configuration of the electronic musical instrument 100.

As shown in FIG. 1 and FIG. 2, the electronic musical instrument 100 includes at least one processor, such as a central processing unit (CPU) 11, a read only memory (ROM) 12, a random access memory (RAM) 13, a keyboard 14, an operation unit 15, a display 16, a sound system 17, and a communication unit 18. These components are connected to one another via a bus 19.

The CPU 11 reads programs and data stored in the ROM 12 to perform various processes using the RAM 13 as a work area, thereby performing centralized control of the components of the electronic musical instrument 100. For example, the CPU 11 causes the sound system 17 to output musical sound, such as sound of a piano, according to the pitch of each pressed key of the keyboard 14 or causes the sound system 17 to output a piece of music selected using the operation unit 15. The CPU 11 also causes the sound system 17 to play music based on audio data input from an external device via the communication unit 18. The CPU 11 performs various processes including a light emission control process, an operation determination process, a cursor movement control process and a character input control process described below.

The ROM 12 stores programs, various data and so forth.

The RAM 13 provides a working memory space for the CPU 11 and stores temporary data.

The keyboard 14 includes a plurality of keys and outputs information on pressed/unpressed keys to the CPU 11.

The operation unit 15 has various switches and operational keys and outputs, to the CPU 11, operation signals corresponding to user operations on the switches and the operational keys. For example, the operation unit 15 includes function keys (F1 key 152, F2 key 153, F3 key 154 and F4 key 155) and an ENTER key 156 shown in FIG. 2.

In this embodiment, the operation unit 15 also includes, as shown in FIG. 2, a ring for input (input ring) 151 that is an annular (in this embodiment, circular annular) input interface. The input ring 151 includes a detector (sensor) 151a having a detection surface and a plurality of light emitters (light emitting diodes (LEDs)) 151b. The detector 151a detects, on the basis of change in capacitance, a contact position (touch position) of an object on the detection surface that is one continuous annular region. The light emitters 151b are disposed alongside at positions corresponding to the detector 151a; to be more specific, annularly disposed, and emit light to make the detection surface light up. The input ring 151 detects the contact position of the object on the detection surface of the input ring 151 and outputs same to the CPU 11, and under the control of the CPU 11, causes, of the light emitters 151b, a light emitter(s) 151b corresponding to the contact position (which may also be referred to as a contact point or a contact part) of the object to emit light. That is, the input ring 151 and the CPU 11 constitute the input interface device of the present disclosure. The detector 151a may detect not only the "contact" of the object with the detection surface but also proximity (no-contact state) of the object to the detection surface by detecting change in capacitance. That is, the detector 151a may detect that the object is in contact with or in proximity to the detection surface by detecting change in capacitance being equal to or greater than a threshold value. The detector 151a is not limited to a sensor that detects change in capacitance. The detector 151a may be any sensor or the like as far as it can detect that the object is in contact with or in proximity to the detection surface. Examples thereof include an optical sensor and a heat-sensing sensor.

In this embodiment, the object is a finger, but not limited thereto and may be a stylus or the like.

The display 16 is constituted of a liquid crystal display (LCD) or the like and performs display in accordance with instructions of display signals input from the CPU 11.

The sound system 17 includes a sound source 171, an audio circuit 172 and a speaker 173.

The sound source 171 reads waveform data stored in advance in the ROM 12 or generates waveform data, and outputs same to the audio circuit 172, in accordance with control instructions from the CPU 11.

The audio circuit 172 converts digital waveform data output from the sound source 171 or digital waveform data (audio data) input from the communication unit 18 into analog data and amplifies same. The speaker 173 outputs the amplified analog sound.

The communication unit 18 transmits and receives data to and from an external device(s), such as an external terminal or an external storage medium exemplified by a USB drive, connected via a communication network, such as the Internet, Bluetooth®, or a communication interface, such as a universal serial bus (USB) cable.

[Operation of Electronic Musical Instrument 100]

Next, operation of the electronic musical instrument 100 will be described.

Those described hereinafter include operation related to the input ring 151 in the electronic instrument 100; to be more specific, distinction between a tap operation and a slide operation on the input ring 151, light emission control of the input ring 151, cursor movement control with the input ring 151, and character input using the input ring 151.

[Distinction between Tap Operation and Slide Operation]

First, distinction between a tap operation and a slide operation on the input ring 151 will be described. The tap operation is an operation of tapping (lightly pushing) the detection surface of the input ring 151 with a finger (object) or bringing a finger (object) close to the detection surface of the input ring 151 for a moment (e.g., less than one second). The slide operation is an operation of moving (sliding) a finger (object) along the input ring 151 (along the light emitters 151b) in a state in which the finger is in contact with or in proximity to the detection surface of the input ring 151.

Figure 3:
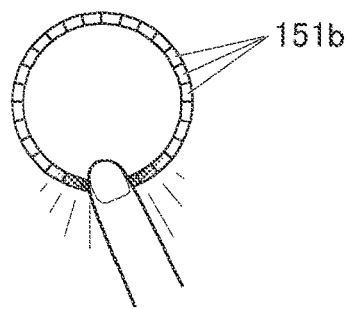
FIG. 3 illustrates a tap operation on an input ring.

FIG. 3 illustrates the tap operation on the input ring 151. When the input ring 151 is tapped with a finger, as shown in FIG. 3, light emitters 151b at the tap-detected position and its surrounding area predetermined emit light (go on), and the other light emitters 151b do not emit light (go out). How and which light emitters 151b emit or not emit light when the slide operation on the input ring 151 is detected will be described later.

The input ring 151 detects even slight change in capacitance caused at a moment when a trembling (minutely moving) finger touches or approaches the circumference of the input ring 151. In this case, coordinates of the touch position (position of the contact or proximity point of the finger with or to the detection surface) detected by the input ring 151 are not fixed values but vary, and therefore even if the operation actually made is the tap operation, it may be determined as the slide operation.

Figure 4:
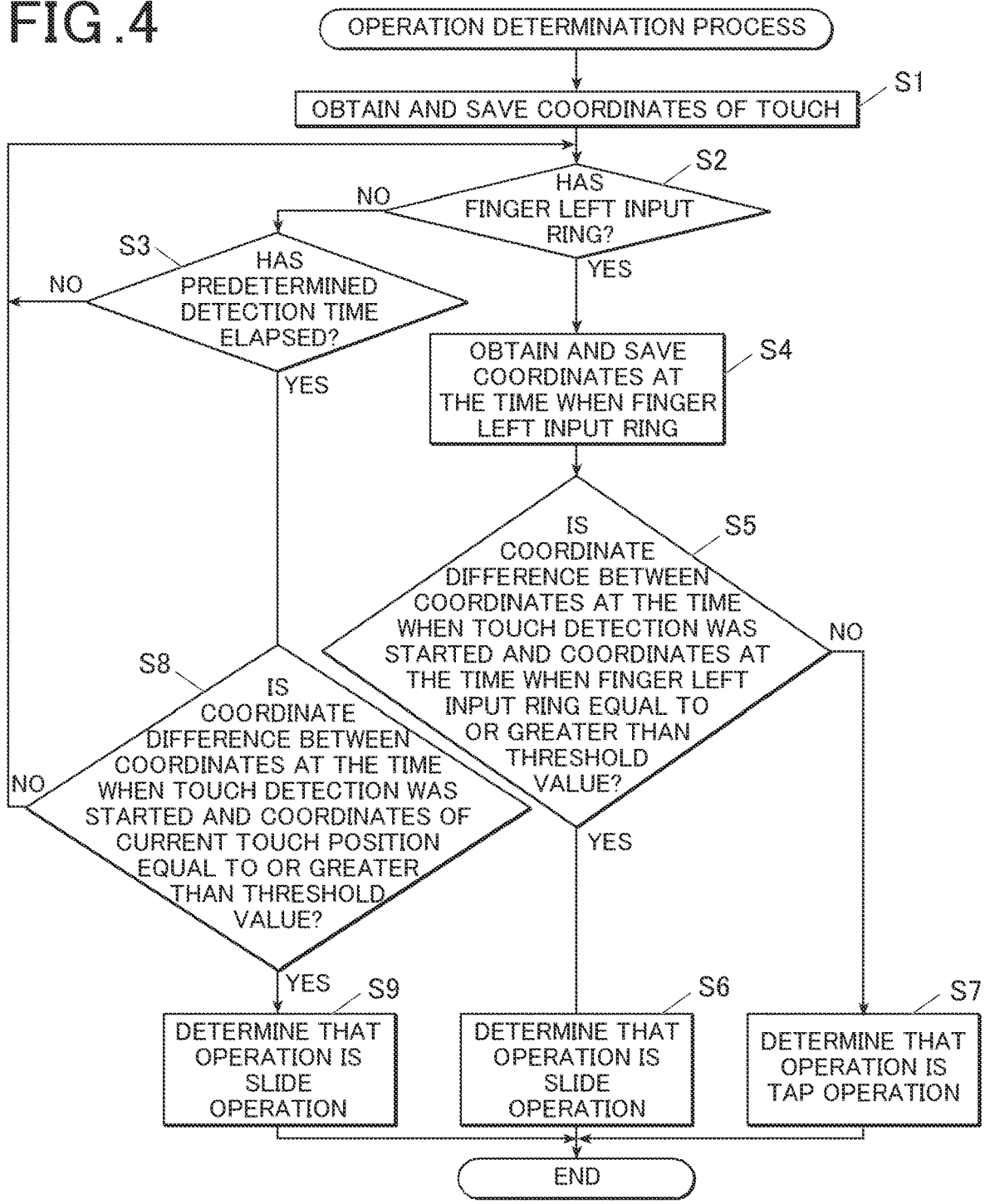
FIG. 4 is a flowchart of an operation determination process that is performed by a CPU shown in FIG. 1.

In this embodiment, when a finger touches or approaches the circumference of the input ring 151 and a touch is detected accordingly, the CPU 11 performs the operation determination process shown in FIG. 4 to determine whether the detected touch is made by the tap operation or the slide operation. The operation determination process is performed by the CPU 11 and the program(s) stored in the ROM 12 working together.

When detection of a touch (touch detection) is started by the input ring 151, the CPU 11 first obtains coordinates of the touch (coordinates of the contact or proximity point of a finger with or to the detection surface) and temporarily saves same in the RAM 13 (Step S1). In this embodiment, coordinates are those virtually set on the detection surface to identify the position of the contact or proximity point. Examples thereof include X, Y coordinates. The "position", "speed" and the like in the following are obtained using such coordinates.

Next, the CPU 11 determines whether the finger has left the input ring 151 (once detected contact or proximity is no longer detected) on the basis of information from the input ring 151 (Step S2).

If the CPU 11 determines that the finger has not left the input ring 151 (Step S2; NO), the CPU 11 determines whether a predetermined detection time has elapsed since the start of the touch detection by the input ring 151 (Step S3).

If the CPU 11 determines that the predetermined detection time has not elapsed yet since the start of the touch detection by the input ring 151 (Step S3; NO), the CPU 11 returns to Step S2.

In Step S2, if the CPU 11 determines that the finger has left the input ring 151 (Step S2; YES), the CPU 11 obtains coordinates at the time when the finger left the input ring 151 and temporarily saves same in the RAM 13 (Step S4). As the coordinates at the time when the finger left the input ring 151, the CPU 11 obtains coordinates detected by the input ring 151 immediately before the contact or proximity of the finger becomes undetected.

Next, the CPU 11 determines whether coordinate difference between the coordinates at the time when the finger touched or approached the input ring 151 (coordinates at the start of the touch detection) and the coordinates at the time when the finger left the input ring 151 is equal to or greater than a predetermined threshold value TH1 (Step S5).

If the CPU 11 determines that the coordinate difference between the coordinates at the time when the finger touched or approached the input ring 151 (coordinates at the start of the touch detection) and the coordinates at the time when the finger left the input ring 151 is equal to or greater than the predetermined threshold value TH1 (Step S5; YES), the CPU 11 determines that the operation made is the slide operation (Step S6) and ends the operation determination process.

If the CPU 11 determines that the coordinate difference between the coordinates at the time when the finger touched or approached the input ring 151 (coordinates at the start of the touch detection) and the coordinates at the time when the finger left the input ring 151 is less than the predetermined threshold value TH1 (Step S5; NO), the CPU 11 determines that the operation made is the tap operation (Step S7) and ends the operation determination process.

If the CPU 11 determines that the finger has not left the input ring 151 (Step S2; NO) and determines that the predetermined detection time has elapsed since the start of the touch detection (Step S3; YES), the CPU 11 determines whether coordinate difference between the coordinates at the start of the touch detection and coordinates of the current touch position is equal to or greater than the predetermined threshold value TH1 (Step S8).

If the CPU 11 determines that the coordinate difference is less than the predetermined threshold value TH1 (Step S8; NO), the CPU 11 returns to Step S2.

If the CPU 11 determines that the coordinate difference is equal to or greater than the predetermined threshold value TH1 (Step S8; YES), the CPU 11 determines that the operation made is the slide operation (Step S9) and ends the operation determination process.

Thus, in the operation determination process, in the case where the coordinates at the time when the finger touched or approached the circumference of the input ring 151 and the coordinates at the time when the finger left the input ring 151 are not the same, if the coordinate difference therebetween is less than the predetermined threshold value TH1, the operation made is determined as the tap operation, whereas if the coordinate difference therebetween is equal to or greater than the predetermined threshold value TH1, the operation made is determined as the slide operation. This enables accurate determination as to whether an operation made by a user with his/her finger is the slide operation or the tap operation even if the fingertip that touched or approached the input ring 151 was trembling.

[Light Emission Control of Input Ring 151]

Next, light emission control of the input ring 151 will be described.

In JP 2020-204868 A, there is disclosed a technique of causing a light source at a position corresponding to a finger being slid on a slide operation section to emit light. However, this light emission method (lighting method) is monotonous and cannot achieve optical presentation smoothly following movement of a finger. For example, this light emission method cannot change optical presentation on the input ring 151 according to the movement speed of a finger operating the input ring 151.

In this embodiment, the CPU 11 performs the light emission control process shown in FIG. 5 when the slide operation is detected, thereby achieving optical presentation on the input ring 151 according to the movement of a finger operating the input ring 151. The light emission control process is performed by the CPU 11 and the program(s) stored in the ROM 12 working together.

While a finger is neither in contact with nor in proximity to the circumference of the input ring 151, the input ring 151 dimly lights up (emits light) with a predetermined luminous intensity that is lower than the luminous intensity in the normal lighting state (maximum luminous intensity). The unit of luminous intensity (luminance) is, for example, nit (candela per square metre).

First, the CPU 11 puts on a light emitter(s) 151*b* corresponding to a position at which a finger is in contact with or in proximity to the detection surface of the input ring 151, the position being detected by the detector 151*a* of the input ring 151, with the luminous intensity, Imax, in the normal lighting state (light emitting state) and puts out the other light emitters 151*b* (Step S21).

Next, the CPU 11 puts on a light emitter(s) 151*b* corresponding to a position (position of the contact or proximity point) at which the finger is currently in contact with or in proximity to the detection surface of the input ring 151, the position being detected by the detector 151*a* of the input ring 151, with the luminous intensity in the normal lighting state (maximum luminous intensity Imax), and also gradually reduces the luminous intensity of each light emitter 151*b* corresponding to a position (passed point) at which the finger being in contact with or in proximity to the detection surface of the input ring 151 once detected by the detector 151*a* of the input ring 151 is no longer detected to put out the light emitter 151*b* in a predetermined time (Step S22). That is, as shown in FIG. 6, the luminous intensity of a light emitter 151*b* at the position at which a finger being in contact with or in proximity to the detection surface once detected by the detector 151*a* is no longer detected gradually decreases in a predetermined time, and the light emitter 151*b* goes out when the predetermined time is reached. This applies to each of all the light emitters 151b. Hence, during the slide operation, movement of light (speed/pace at which light emitters 151b go out) from the point(s) at which once detected contact or proximity of a finger is no longer detected (point at which a light emitter 151b emits light with the luminous intensity in the normal lighting state and then with the luminous intensity decreasing) to the current contact or proximity point is always the same (constant).

Therefore, as described below, if the user quickly slides his/her finger on (which includes substantially on) the circumference of the input ring 151, lighting (optical presentation) is like the finger leaving a long trail, whereas if the user slowly slides his/her finger on the circumference of the input ring 151, lighting (optical presentation) is like the finger not leaving a long trail.

Next, the CPU 11 determines whether the finger has left the input ring 151 (Step S23).

If the CPU 11 determines that the finger has not left the input ring 151 (Step S23; NO), the CPU 11 returns to Step S22.

If the CPU 11 determines that the finger has left the input ring 151 (Step S23; YES), the CPU 11 puts on all the light emitters 151b with a predetermined luminous intensity that is lower than the luminous intensity in the normal lighting state (predetermined luminous intensity with which the light emitters 151b (input ring 151) dimly light up) (Step S24) and ends the light emission control process.

Figure 7A:
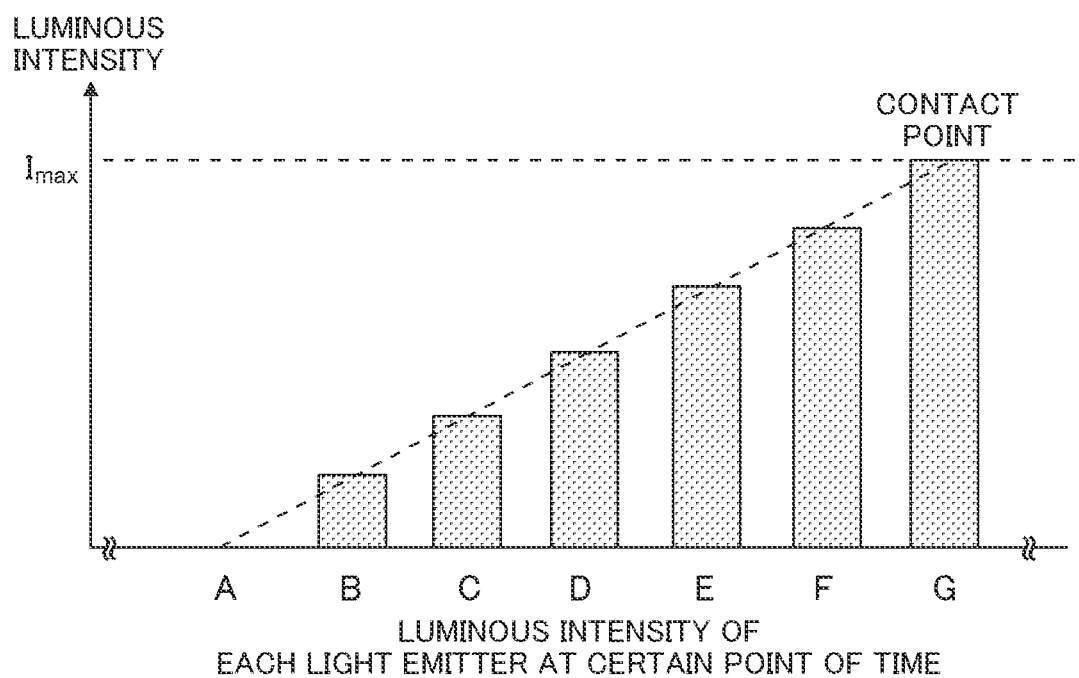
FIG. 7A is a graph to show the luminous intensity of each light emitter at a certain point of time, each light emitter corresponding to a point that a finger being quickly slid on the circumference of the input ring has passed through in the light emission control process shown in FIG. 5.
Figure 7B:
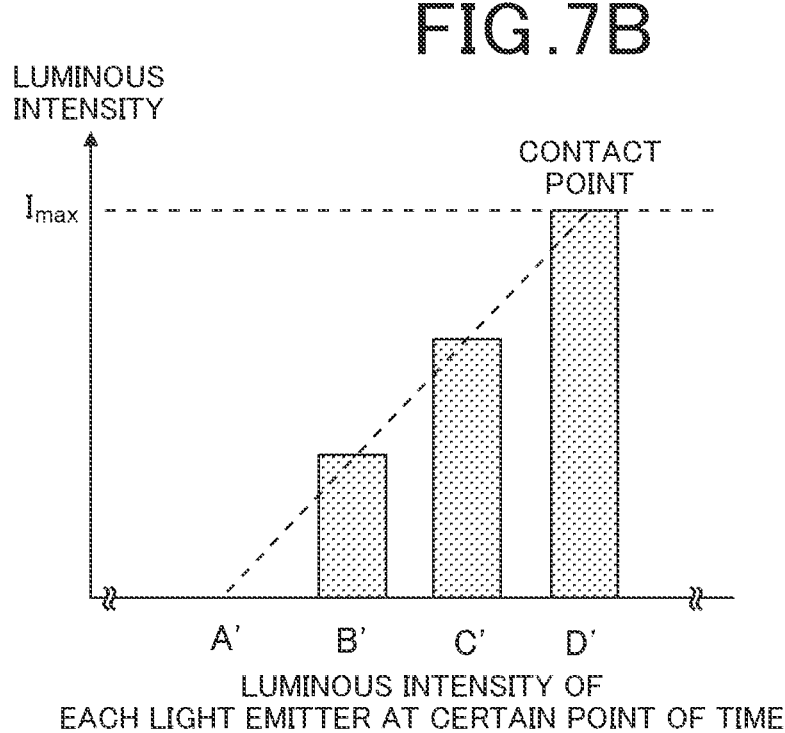
FIG. 7B is a graph to show the luminous intensity of each light emitter at a certain point of time, each light emitter corresponding to a point that a finger being slowly slid on the circumference of the input ring has passed through in the light emission control process shown in FIG. 5.

FIG. 7A is a graph to show the luminous intensity of each light emitter 151b at a certain point of time, each light emitter 151b corresponding to a point that a finger being quickly slid on the circumference of the input ring 151 has passed through in the light emission control process. FIG. 7B is a graph to show the luminous intensity of each light emitter 151b at a certain point of time, each light emitter 151b corresponding to a point that a finger being slowly slid on the circumference of the input ring 151 has passed through in the light emission control process. The A to F and A' to C' represent, among the plurality of light emitters 151b, light emitters 151b corresponding to points that a finger has passed through, wherein A and A' represent light emitters 151b emitting light with a luminous intensity of 0 (no-lighting state), and G and D' represent light emitters 151b emitting light with the maximum luminous intensity Imax (light emitters 151b each corresponding to the contact or proximity point). In each of FIG. 7A and FIG. 7B, luminous intensities of light emitters 151b adjacent to one another are different, but light emission may be controlled such that two or more light emitters 151b adjacent to one another emit light with the same luminous intensity. In each of FIG. 7A and FIG. 7B, the speed at which the finger is slid is constant for the sake of explanation.

Figure 8A:
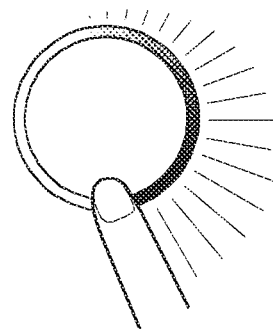
FIG. 8A illustrates light emission of the input ring with a finger quickly slid on the circumference of the input ring in the light emission control process shown in FIG. 5.
Figure 8B:
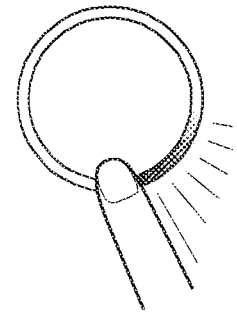
FIG. 8B illustrates light emission of the input ring with a finger slowly slid on the circumference of the input ring in the light emission control process shown in FIG. 5.

FIG. 8A illustrates light emission of the input ring 151 with a finger slid on the circumference of the input ring 151 more quickly than a certain speed in the light emission control process. FIG. 8B illustrates light emission of the input ring 151 with a finger slid on the circumference of the input ring 151 more slowly than the speed in the case of FIG. 8A (or the certain speed) in the light emission control process.

In FIG. 8A to FIG. 9B, the luminous intensity on the input ring 151 is indicated by color density. The darker the color is, the higher the luminous intensity is. White indicates no light emission. Solid lines radiating from the input ring 151 virtually show that the input ring 151 is emitting light.

If a finger is slid on the circumference of the input ring 151 more quickly than a certain speed, the movement amount of the finger in a unit time is relatively large (the number of light emitters 151b that the finger passes through is relatively large). Hence, the pace at which light emitters 151b light up as they become corresponding to the finger-touching/approaching point (contact or proximity point) is faster than the pace at which light emitters 151b go out as they become corresponding to the finger-passed point(s) (passed point(s)). As a result, as shown in the graph of FIG. 7A, there are many not-fully-went-out light emitters 151b (light emitters 151b emitting light with relatively low luminous intensities) and accordingly, as shown in FIG. 8A, optical presentation is like a finger leaving a long trail.

On the other hand, if a finger is slid on the circumference of the input ring 151 more slowly than the speed in the case of FIG. 8A (or the certain speed), the movement amount of the finger in the unit time is smaller (the number of light emitters 151b that the finger passes through is smaller) than the movement amount thereof in the case of FIG. 8A (or the case where the finger is moved at the certain speed). Hence, the pace at which light emitters 151b light up as they become corresponding to the finger-touching/approaching point is (equal to or) slower than the pace at which light emitters 151b go out as they become corresponding to the finger-passed point(s). As shown in and described with reference to FIG. 6, time from when each light emitter 151b emits light with the luminous intensity in the normal lighting state (maximum luminous intensity) until when each light emitter 151b goes out in the case of FIG. 8B is the same as the time from when each light emitter 151b emits light with the luminous intensity in the normal lighting state (maximum luminous intensity) until when each light emitter 151b goes out in the case of FIG. 8A. Therefore, as shown in the graph of FIG. 7B, as compared with FIG. 7A, there are a few light emitters 151b emitting light with relatively low luminous intensities and accordingly, as shown in FIG. 8B, optical presentation is like a finger not leaving a long trail.

Thus, in the light emission control process, if the slide operation is made on the circumference of the input ring 151, the CPU 11 gradually reduces the luminous intensity of each light emitter 151b corresponding to, on the input ring 151, the point (finger-passed point) where the finger is no longer detected to put out the light emitter 151b in a predetermined time. Hence, if the user quickly slides his/her finger on the circumference of the input ring 151, optical presentation can be like the finger leaving a long trail, whereas if the user slowly slides his/her finger on the circumference of the input ring 151, optical presentation can be like the finger not leaving a long trail. Thus, the tap operation and the slide operation can provide clearly different patterns of optical presentation (lighting) on the input ring 151, which allows the user to feel that he/she really has made an operation (operational feeling) as compared with the conventional simple method of causing a light emitter 151b at the contact point to emit light. According to the present disclosure, it is possible to expand the range of expression of optical presentation on the input ring 151 according to the movement speed of a finger.

[Modification of Light Emission Control of Input Ring 151]

If LEDs of the light emitters 151b of the input ring 151 are multi-color LEDs, the color of light that they emit may be changed according to the movement speed (angular velocity) of the slide operation on the circumference of the input ring 151. For example, the CPU 11 obtains the movement amount of the touch position touched by a finger on the input ring 151 per unit time (angular velocity of the touch position relative to the center of the input ring 151) when the finger is slid on the circumference of the input ring 151, and determines the color of light that the light emitters 151b of the input ring 151 emit referring to a table stored in advance in the ROM or the like, the table where angular velocities are associated with colors of light that the light emitters 151b emit. For example, if the angular velocity detected (obtained) is less than a threshold value, the CPU 11 may cause the light emitters 151b to emit green light, whereas if the angular velocity detected (obtained) is equal to or greater than the threshold value, the CPU 11 may cause the light emitters 151b to emit blue light. The number of threshold values and colors of light to be set are not limited and hence may be two or more. The LEDs may not be multi-color LEDs but single-color LEDs that emit light of different colors.

If the slide operation on the input ring 151 is detected, in addition to the light emission control of the light emitters 151b at the finger-passed points in the above light emission control process, the CPU 11 may perform control to cause light emitters 151b present in a direction (moving direction) to which the finger moves to emit light with luminous intensities that are lower as their distances from the contact or proximity point of the finger with or to the detection surface are greater.

Figure 9A:
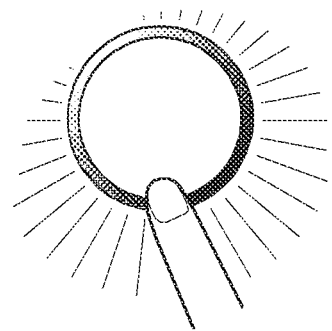
FIG. 9A illustrates light emission of the input ring according to a modification with a finger quickly slid on the circumference of the input ring.
Figure 9B:
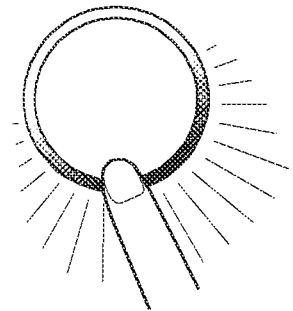
FIG. 9B illustrates light emission of the input ring according to the modification with a finger slowly slid on the circumference of the input ring.

FIG. 9A illustrates light emission of the input ring 151 according to a modification with a finger slid on the circumference of the input ring 151 more quickly than a certain speed. FIG. 9B illustrates light emission of the input ring 151 according to the modification with a finger slid on the circumference of the input ring 151 more slowly than the speed in the case of FIG. 9A (or the certain speed).

As shown in FIG. 9A and FIG. 9B, not only the light emitters 151b at the finger-passed points but also the light emitters 151b in the moving direction to which the finger moves are controlled to light up (emit light), so that the light emitters 151b at the contact or proximity point of the finger with or to the detection surface and therearound emit light. This enables more noticeable presentation/display of the contact or proximity point.

[Cursor Movement Control Process]

Next, control of cursor movement on a menu screen or the like with the input ring 151 will be described.

Conventionally, there is a technique of moving a cursor for menu items or the like displayed on a display by turning a physical encoder (rotary encoder, dial, etc.). With such a physical encoder, a cursor moves the amount by which the encoder is turned.

Figure 10:
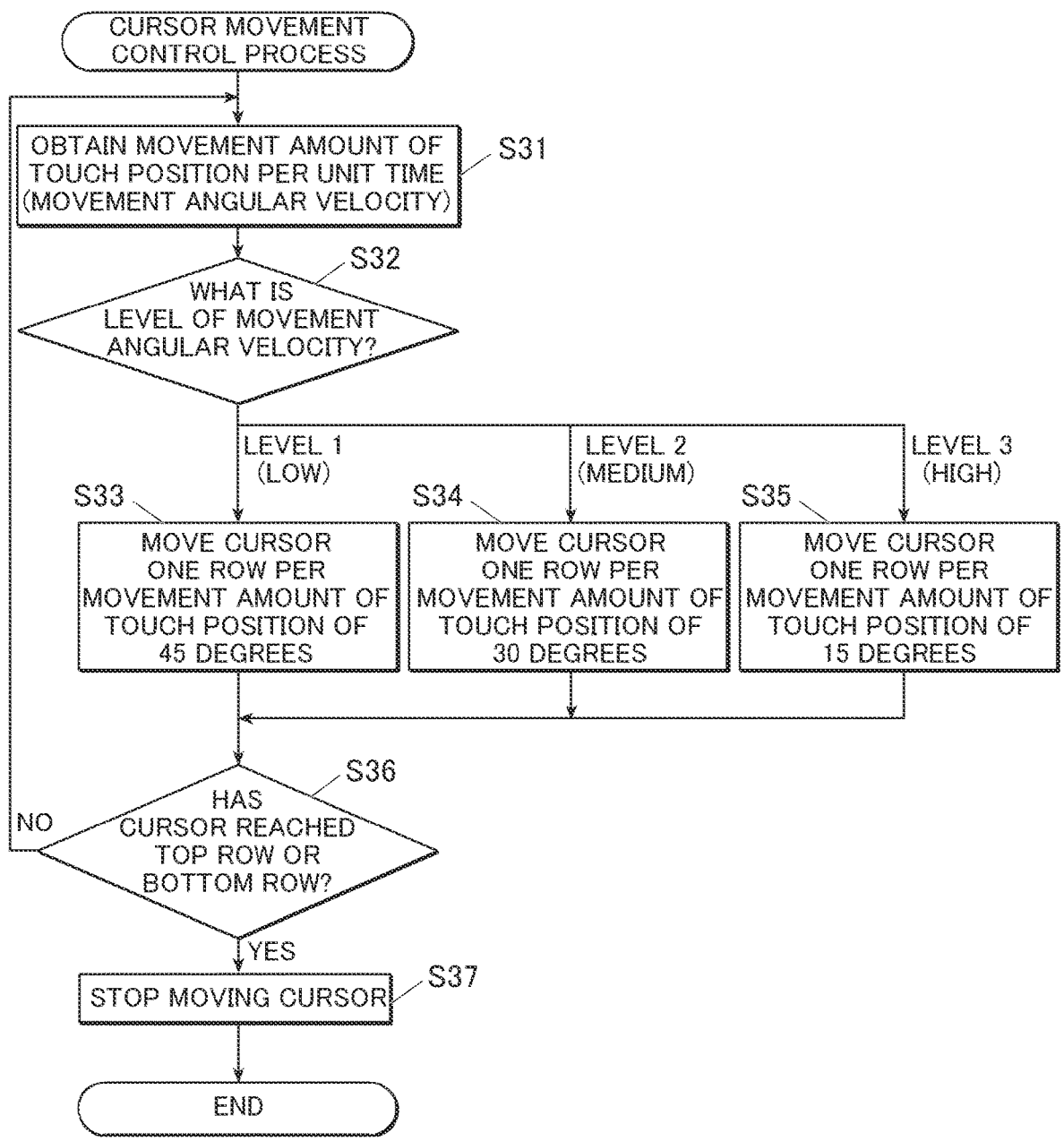
FIG. 10 is a flowchart of a cursor movement control process that is performed by the CPU shown in FIG. 1.

In contrast, in this embodiment, when a finger is slid on the circumference of the input ring 151 with a predetermined screen (e.g., a menu screen 161 shown in FIG. 11A and FIG. 11B) displayed on the display 16, the CPU 11 performs the cursor movement control process shown in FIG. 10 to change the movement speed of a cursor displayed on the display 16 according to the movement speed of the finger-touching/approaching point (contact or proximity point). The cursor movement control process is performed by the CPU 11 and the program(s) stored in the ROM 12 working together.

In this embodiment, the CPU 11 performs the cursor movement control process in parallel with the light emission control process of the input ring 151.

When a finger is slid on the circumference of the input ring 151 with the menu screen 161 displayed on the display 16, the CPU 11 obtains the movement amount of the touch position on the input ring 151 per unit time (e.g., 100 ms) (angular velocity of the touch position relative to the center of the input ring 151, which hereinafter may be referred to as "angular velocity of movement" or more simply "movement angular velocity") (Step S31).

Next, the CPU 11 determines the level of the obtained movement angular velocity (Step S32).

For example, the CPU 11 determines that the movement angular velocity is level 1 (low) if it is less than a predetermined first threshold value, determines that the movement angular velocity is level 2 (medium) if it is equal to or greater than the first threshold value but less than a predetermined second threshold value, and determines that the movement angular velocity is level 3 (high) if it is equal to or greater than the second threshold value. In this embodiment, "First Threshold Value<Second Threshold Value" holds.

If the CPU 11 determines that the movement angular velocity is level 1 (Step S32; Level 1), the CPU 11 moves the cursor on the display 16 one row (one line) per movement amount of the touch position of 45 degrees (Step S33) and proceeds to Step S36.

If the CPU 11 determines that the movement angular velocity is level 2 (Step S32; Level 2), the CPU 11 moves the cursor on the display 16 one row (one line) per movement amount of the touch position of 30 degrees (Step S34) and proceeds to Step S36.

If the CPU 11 determines that the movement angular velocity is level 3 (Step S32; Level 3), the CPU 11 moves the cursor on the display 16 one row (one line) per movement amount of the touch position of 15 degrees (Step S35) and proceeds to Step S36.

If the slide operation is a clockwise slide, the CPU 11 moves the cursor in the forward direction such as downward or rightward, whereas if the slide operation is a counterclockwise slide, the CPU 11 moves the cursor in the backward direction such as upward or leftward. If the forward direction and the backward direction are respectively rightward and leftward, the "one row" above is replaced by "one column" or the like, and the "top row" and the "bottom row" below are respectively replaced by "rightmost column" and "leftmost column" or the like.

In Step S36, the CPU 11 determines whether the cursor has reached the top row or the bottom row of the menu items (Step S36).

If the CPU 11 determines that the cursor has not reached the top row or the bottom row of the menu items (Step S36; NO), the CPU 11 returns to Step S31 to repeat Steps S31 to S36.

If the CPU 11 determines that the cursor has reached the top row or the bottom row of the menu items (Step S36; YES), the CPU 11 stops moving the cursor (Step S37) and ends the cursor movement control process.

Figure 11A:
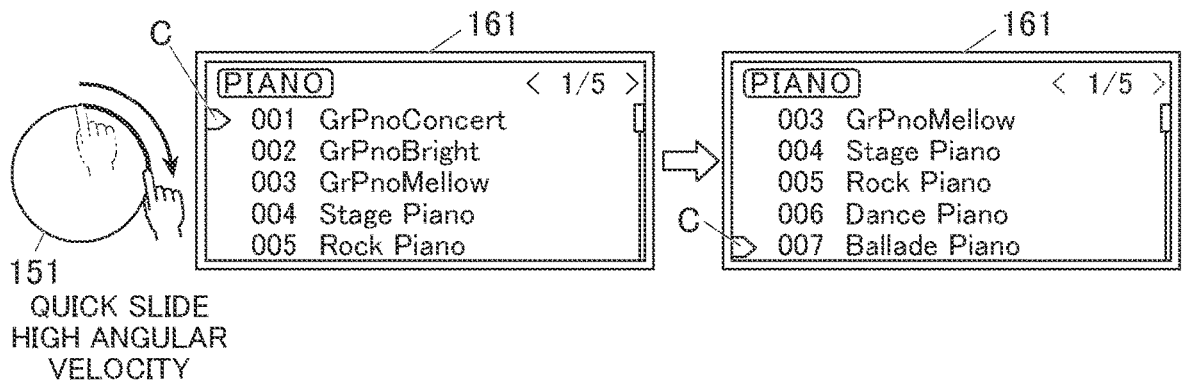
FIG. 11A shows change in the position of a cursor displayed on a menu screen of a display with a finger quickly slid on the circumference of the input ring in the cursor movement control process shown in FIG. 10.

FIG. 11A shows change in the position of a cursor C displayed on the menu screen 161 of the display 16 with a finger quickly slid (at a high movement angular velocity) on the circumference of the input ring 151 in the cursor movement control process.

Figure 11B:
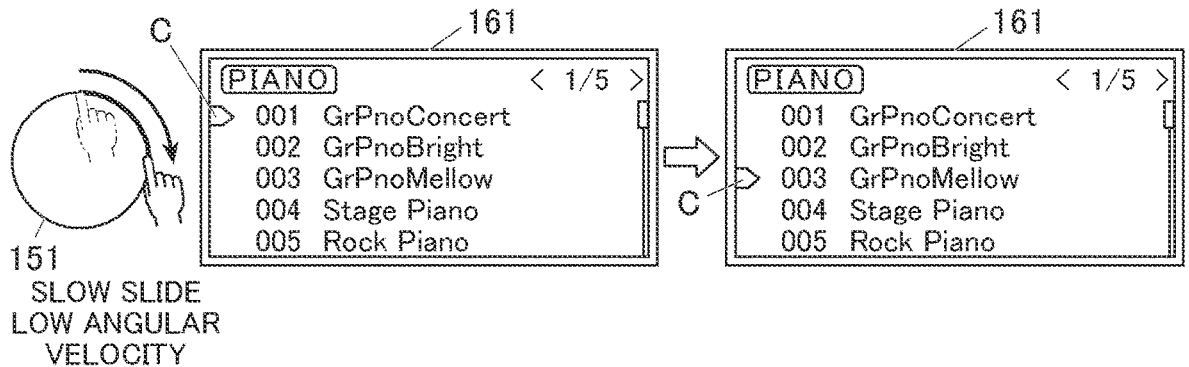
FIG. 11B shows change in the position of the cursor displayed on the menu screen of the display with a finger slowly slid on the circumference of the input ring in the cursor movement control process shown in FIG. 10.

FIG. 11B shows change in the position of the cursor C displayed on the menu screen 161 of the display 16 with a finger slowly slid (at a low movement angular velocity) on the circumference of the input ring 151 in the cursor movement control process.

The cursor C has moved six rows (+6) in FIG. 11A, but has moved only two rows (+2) in FIG. 11B. Thus, the movement speed of the cursor C (change amount of the position of the cursor C) can be changed according to the speed (angular velocity) at which the finger is slid on the circumference of the input ring 151.

According to the cursor movement control process, the movement speed of the cursor C (change amount of the position of the cursor C) can be changed according to the speed at which a finger is slid on the circumference of the input ring 151 (movement speed (angular velocity) of the contact or proximity point).

If a value (e.g., sound volume) is displayed on the display 16, the CPU 11 may change the speed of increase or decrease of the displayed value according to the movement speed (angular velocity) of the contact or proximity point of a finger with or to the detection surface on the circumference of the input ring 151. That is, if a finger is quickly slid on the circumference of the input ring 151, the increase/decrease speed of the displayed value may be high, whereas if a finger is slowly slid on the circumference of the input ring 151, the increase/decrease speed of the displayed value may be low.

[Character Input Control Process]

Next, character input using the input ring 151 will be described.

Conventionally, in order to input a character(s) on a character input screen displayed on a display, cursor keys or a numeric keypad is used to move a cursor and turn (switch) characters (select a character to input). Hence, even if a physical encoder is provided, cursor keys or a numeric keypad is also needed.

Figure 12:
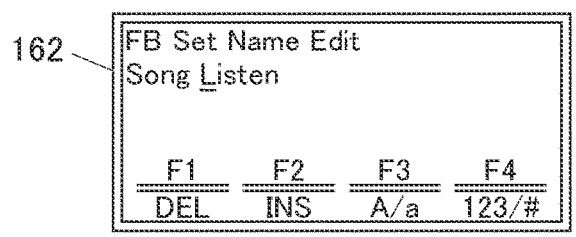
FIG. 12 shows an example of a character input screen.

In this embodiment, the CPU 11 performs the character input control process shown in FIG. 13 with, for example, a character input screen 162 shown in FIG. 12 displayed on the display 16 to move a cursor and select a character to input using the input ring 151. The character input control process is performed by the CPU 11 and the program(s) stored in the ROM 12 working together.

In this embodiment, the CPU 11 performs the character input control process in parallel with the light emission control process of the input ring 151.

First, the CPU 11 determines whether the slide operation on the input ring 151 or the tap operation on the top region or the bottom region of the input ring 151 has been detected (Step S41).

The top region of the input ring 151 is the region on the upper side among four regions of the top, bottom, right and left regions into which the circumference of the input ring 151 is divided. The bottom region of the input ring 151 is the region on the lower side among the four regions of the top, bottom, right and left regions into which the circumference of the input ring 151 is divided.

If the CPU 11 determines that the slide operation on the input ring 151 or the tap operation on the top region or the bottom region of the input ring 151 has been detected (Step S41; YES), the CPU 11 selects a character to input according to the detected operation (Step S42) and proceeds to Step S43.

If the detected operation is the slide operation on the input ring 151, the CPU 11 switches characters, for displaying a character to input, each time the touch position moves a predetermined amount on the circumference, and selects the character displayed when the slide operation finishes as an input character. If the detected slide operation is a clockwise slide, the CPU 11 switches and displays characters in ascending order (e.g., in alphabetical order from A to Z), whereas if the detected slide operation is a counterclockwise slide, the CPU 11 switches and displays characters in descending order (e.g., in counter-alphabetical order from Z to A).

If the detected operation is the tap operation on the bottom region, the CPU 11 switches and displays characters in ascending order (e.g., in alphabetical order from A to Z) each time the bottom region of the input ring 151 is tapped. If the detected operation is the tap operation on the top region, the CPU 11 switches and displays characters in descending order (e.g., in counter-alphabetical order from Z to A) each time the top region of the input ring 151 is tapped. The CPU 11 selects the character displayed when the tap operation finishes as an input character.

If the CPU 11 determines that neither the slide operation on the input ring 151 nor the tap operation on the top region or the bottom region has been detected (Step S41; NO), the CPU 11 proceeds to Step S43.

In Step S43, the CPU 11 determines whether the tap operation on the left region or the right region of the input ring 151 has been detected (Step S43).

The right region of the input ring 151 is the region on the right side among the four regions of the top, bottom, right and left regions into which the circumference of the input ring 151 is divided. The left region of the input ring 151 is the region on the left side among the four regions of the top, bottom, right and left regions into which the circumference of the input ring 151 is divided.

If the CPU 11 determines that the tap operation on the left region or the right region of the input ring 151 has been detected (Step S43; YES), the CPU 11 moves the cursor on the display 16 according to the detected operation (Step S44) and proceeds to Step S45.

For example, the CPU 11 moves the cursor displayed on the display 16 one character (one character space) to the right each time the right region of the input ring 151 is tapped. When the cursor reaches the right end, the CPU 11 stops the cursor or moves the cursor to the left end. On the other hand, the CPU 11 moves the cursor displayed on the display 16 one character (one character space) to the left each time the left region of the input ring 151 is tapped. When the cursor reaches the left end, the CPU 11 stops the cursor or moves the cursor to the right end.

If the CPU 11 determines that the tap operation on the left region or the right region of the input ring 151 has not been detected (Step S43; NO), the CPU 11 proceeds to Step S45.

In Step S45, the CPU 11 determines whether the F1 key 152 has been pressed (Step S45).

If the CPU 11 determines that the F1 key 152 has been pressed (Step S45; YES), the CPU 11 deletes a character at the current cursor position (Step S46) and proceeds to Step S47.

If the CPU 11 determines that the F1 key 152 has not been pressed (Step S45; NO), the CPU 11 proceeds to Step S47.

In Step S47, the CPU 11 determines whether the F2 key 153 has been pressed (Step S47).

If the CPU 11 determines that the F2 key 153 has been pressed (Step S47; YES), the CPU 11 inserts a character (e.g., default character A) at the current cursor position (Step S48) and proceeds to Step S49.

If the CPU 11 determines that the F2 key 153 has not been pressed (Step S47; NO), the CPU 11 proceeds to Step S49.

In Step S49, the CPU 11 determines whether the F3 key 154 has been pressed (Step S49).

If the CPU 11 determines that the F3 key 154 has been pressed (Step S49; YES), the CPU 11 switches the case of a letter at the cursor position to an uppercase letter or a lowercase letter (Step S50) and proceeds to Step S51. If the cursor is located at a number or a symbol, the CPU 11 switches the number or the symbol to "A" (uppercase letter of the alphabet).

If the CPU 11 determines that the F3 key 154 has not been pressed (Step S49; NO), the CPU 11 proceeds to Step S51.

In Step S51, the CPU 11 determines whether the F4 key 155 has been pressed (Step S51).

If the CPU 11 determines that the F4 key 155 has been pressed (Step S51; YES), the CPU 11 switches a number or a symbol at the cursor position to a symbol or a number (Step S52) and proceeds to Step S53. If the cursor is located at a letter of the alphabet, the CPU 11 switches the letter to "0" (number).

If the CPU 11 determines that the F4 key 155 has not been pressed (Step S51; NO), the CPU 11 proceeds to Step S53.

In Step S53, the CPU 11 determines whether the ENTER key 156 has been pressed (Step S53).

If the CPU 11 determines that the ENTER key 156 has not been pressed (Step S53; NO), the CPU 11 returns to Step S41.

If the CPU 11 determines that the ENTER key 156 has been pressed (Step S53; YES), the CPU 11 saves the input character (character displayed on the character input screen 162) in the RAM 13 (Step S54) and ends the character input control process.

According to the character input control process, a character to input can be selected (characters can be switched) by the slide operation on the circumference of the input ring 151 or the tap operation on the top region or the bottom region of the input ring 151. Further, the cursor on the display 16 can be moved to the right or the left by the tap operation on the right region or the left region of the circumference of the input ring 151. Thus, selection of a character to input and movement of a cursor can be performed with no cursor keys or numeric keypad provided.

As described above, the CPU 11 of the electronic musical instrument 100 of this embodiment performs control to cause, among the plurality of light emitters 151b of the input ring 151, a first light emitter(s) corresponding to the contact or proximity point detected by the detector 151a of the input ring 151, the contact or proximity point at which an object is in contact with or in proximity to the detection surface of the input ring 151, to emit light with a luminous intensity that is higher than the luminous intensity of the remaining light emitter(s) 151b, and while the object is moving along the plurality of light emitters 151b in the state in which the object is in contact with or in proximity to the detection surface, performs control to gradually reduce the luminous intensity of, among the plurality of light emitters 151b, a second light emitter(s) corresponding to the point (passed point) at which the object being in contact with or in proximity to the detection surface once detected by the detector 151a is no longer detected to put out the second light emitter in a predetermined time.

If the user quickly slides his/her finger on the circumference of the input ring 151, optical presentation on the input ring 151 can be like the finger leaving a long trail, whereas if the user slowly slides his/her finger on the circumference of the input ring 151, optical presentation on the input ring 151 can be like the finger not leaving a long trail. Thus, the above can expand the range of expression of optical presentation on the input ring 151 according to the movement speed of a finger.

Further, while the object is moving along the plurality of light emitters 151b in the state in which the object is in contact with or in proximity to the detection surface of the input ring 151, the CPU 11 performs control to make luminous intensities of, among the plurality of light emitters 151b, light emitters 151b that are from the second light emitter to the first light emitter different from one another as shown in FIG. 7A and FIG. 7B.

This can expand the range of expression of optical presentation on the input ring 151 in the case where the object is moving along the plurality of light emitters 151b in the state in which the object is in contact with or in proximity to the detection surface.

Further, the detection surface of the input ring 151 is one continuous annular region. This makes the appearance of the input ring 151 smooth and allows the user to have smooth operational feeing.

Further, while the object is moving along the plurality of light emitters 151b in the state in which the object is in contact with or in proximity to the input ring 151, the CPU 11 further performs control to cause, among the plurality of light emitters 151b, a third light emitter(s) in the moving direction to which the object moves to emit light with a light intensity that is lower as the distance from the contact or proximity point to the third light emitter is greater. This enables more noticeable display/presentation of the contact or proximity point.

Further, the CPU 11 changes the movement speed of a cursor (e.g., cursor C) or the increase/decrease speed of a value displayed on the display 16 according to the movement speed of the contact or proximity point of the object with or to the input ring 151, for example, according to the angular velocity of the moving contact or proximity point of the object with or to the input ring 151. This realizes the operational feeing according to the movement speed of a finger of the user.

Those described in the above embodiment and modification are not limitations but some of preferred examples of the input interface device, the electronic musical instrument, the light emission control method and the storage medium storing the program(s) of the present disclosure.

For example, in the above embodiment, the input ring 151 as the input interface included in the input interface device of the present disclosure is provided in the electronic musical instrument 100, but the input interface of the present disclosure may be provided not in an electronic musical instrument but in another electronic apparatus as an operation unit.

Further, in the above embodiment, the input ring 151 is circular annular, but not limited thereto and may be oval, square, rectangular or the like.

Further, in the above embodiment, the CPU 11, which controls the entire electronic musical instrument 100, performs the light emission control of the input ring 151, but the input ring 151 may be provided with a CPU(s) or a microprocessor(s) that performs the light emission control process.

Further, in the above, the computer-readable storage medium storing the program(s) of the present disclosure is a nonvolatile memory, such as a ROM, but not limited thereto and may be an HDD, an SSD or a portable recording medium, such as a CD-ROM. Further, as a medium to provide data of the program(s) of the present disclosure via a communication line, a carrier wave can be used.

The specific configuration/components of and operation related to the input ring (input interface) can also be appropriately changed without departing from the scope of the present disclosure.

Although one or more embodiments of the present disclosure have been described above, the technical scope of the present disclosure is not limited to the embodiments described above but defined on the basis of claims stated below. The technical scope of the present disclosure includes the scope equivalent to the claims with changes irrelevant to the essence of the present disclosure made from the claims.

The invention claimed is:

1. An input interface device comprising:
a detector having a detection surface and detecting configured to detect that an object is in contact with or in proximity to the detection surface;
a plurality of light emitters disposed alongside the detector and configured to emit light to make the detection surface light up at positions corresponding to the light emitters; and
at least one processor that
performs control to cause a first light emitter among the plurality of light emitters to emit light with a luminous intensity that is higher than a luminous intensity of a remaining light emitter, wherein the first light emitter corresponds to a contact or proximity point detected by the detector at which the object is in contact with or in proximity to the detection surface,
while the object is moving along the detection surface in a state in which the object is in contact with or in proximity to the detection surface, performs control to gradually reduce a luminous intensity of a second light emitter among the plurality of light emitters, wherein the second light emitter corresponds to a position behind the contact or proximity point along a moving direction of the object along the detection surface where the object was previously detected as being in contact with or in proximity to the detection surface and at which the object is no longer detected as being in contact with or in proximity to the detection surface, and
while the object is moving along the detection surface in the state in which the object is in contact with or in proximity to the detection surface, performs control to cause a third light emitter among the plurality of light emitters to emit light, wherein the third light emitter corresponds to a position in front of the contact or proximity point along the moving direction of the object along the detection surface where the object has not yet been detected as being in contact with or in proximity to the detection surface.

2. The input interface device according to claim 1, wherein while the object is moving along the detection surface in the state in which the object is in contact with or in proximity to the detection surface, the processor performs control to make luminous intensities of, among the plurality of light emitters, light emitters that are from the second light emitter to the first light emitter different from one another.

3. The input interface device according to claim 1, wherein the detection surface is one continuous annular region.

4. The input interface device according to claim 1, wherein the detection surface has a circular annular shape, and the plurality of light emitters is disposed so as to be in a circular annular arrangement.

5. The input interface device according to claim 1, wherein the detector detects that the object is in contact with or in proximity to the detection surface in response to a change in capacitance being equal to or greater than a threshold value.

6. The input interface device according to claim 1, wherein while the object is moving along the detection surface in the state in which the object is in contact with or in proximity to the detection surface, the processor performs control to cause a light intensity of the third light emitter to be lower as a distance from the contact or proximity point to the third light emitter is greater.

7. The input interface device according to claim 1, wherein the processor changes a movement speed of a cursor or an increase or decrease speed of a value displayed on a display according to a movement speed of the contact or proximity point.

8. The input interface device according to claim 4, wherein the processor changes a movement speed of a cursor or an increase or decrease speed of a value displayed on a display according to an angular velocity of the contact or proximity point of the object with or to the circular annular detection surface relative to a center of the circular annular detection surface, while the contact or proximity point is moving.

9. The input interface device according to claim 1, wherein the processor determines a color of the light that the plurality of light emitters emits according to a moving speed of the contact or proximity point.

10. An electronic musical instrument comprising the input interface device according to claim 1.

11. A light emission control method that is performed by a computer that controls an input interface including a detector having a detection surface and configured to detect that an object is in contact with or in proximity to the detection surface and a plurality of light emitters disposed alongside the detector and configured to emit light to make the detection surface light up at positions corresponding to the light emitters, the method comprising:
performing control to cause a first light emitter among the plurality of light emitters to emit light with a luminous intensity that is higher than a luminous intensity of a remaining light emitter, wherein the first light emitter corresponds to a contact or proximity point detected by the detector at which the object is in contact with or in proximity to the detection surface,
while the object is moving along the detection surface in a state in which the object is in contact with or in proximity to the detection surface, performing control to gradually reduce a luminous intensity of a second light emitter among the plurality of light emitters, wherein the second light emitter corresponds to a position behind the contact or proximity point along a moving direction of the object along the detection surface where the object was previously detected as being in contact with or in proximity to the detection surface and at which the object is no longer detected as being in contact with or in proximity to the detection surface, and
while the object is moving along the detection surface in the state in which the object is in contact with or in proximity to the detection surface, performing control to cause a third light emitter among the plurality of light emitters to emit light, wherein the third light emitter corresponds to a position in front of the contact or proximity point along the moving direction of the object along the detection surface where the object has not yet been detected as being in contact with or in proximity to the detection surface.

12. The light emission control method according to claim 11 further comprising, while the object is moving along the detection surface in the state in which the object is in contact with or in proximity to the detection surface, performing control to make luminous intensities of, among the plurality of light emitters, light emitters that are from the second light emitter to the first light emitter different from one another.

13. The light emission control method according to claim 11, wherein the detection surface is one continuous annular region.

14. The light emission control method according to claim 11, wherein the detection surface has a circular annular shape, and the plurality of light emitters is disposed so as to be in a circular annular arrangement.

15. The light emission control method according to claim 11, wherein the detector detects that the object is in contact with or in proximity to the detection surface in response to a change in capacitance being equal to or greater than a threshold value.

16. The light emission control method according to claim 11, further comprising, while the object is moving along the detection surface in the state in which the object is in contact with or in proximity to the detection surface, performing control to cause a light intensity of the third light emitter to be lower as a distance from the contact or proximity point to the third light emitter is greater.

17. The light emission control method according to claim 11, further comprising changing a movement speed of a cursor or an increase or decrease speed of a value displayed on a display according to a movement speed of the contact or proximity point.

18. The light emission control method according to claim 14, further comprising changing a movement speed of a cursor or an increase or decrease speed of a value displayed on a display according to an angular velocity of the contact or proximity point of the object with or to the circular annular detection surface relative to a center of the circular annular detection surface, while the contact or proximity point is moving.

19. The light emission control method according to claim 11, further comprising determining a color of the light that the plurality of light emitters emits according to a moving speed of the contact or proximity point.

20. A non-transitory computer-readable storage medium storing a program causing a computer that controls an input interface including a detector having a detection surface and configured to detect that an object is in contact with or in proximity to the detection surface and a plurality of light emitters disposed alongside the detector and configured to emit light to make the detection surface light up at positions corresponding to the light emitters, to:

perform control to cause, among the plurality of light emitters to emit light with a luminous intensity that is higher than a luminous intensity of a remaining light emitter, wherein the first light emitter corresponds to a contact or proximity point detected by the detector, the contact or proximity point at which the object is in contact with or in proximity to the detection surface, to emit light with a luminous intensity that is higher than a luminous intensity of a remaining light emitter, and while the object is moving along the plurality of light emitters in a state in which the object is in contact with or in proximity to the detection surface, perform control to gradually reduce a luminous intensity of a second light emitter among the plurality of light emitters, wherein the second light emitter corresponds to a position behind the contact or proximity point along a moving direction of the object along the detection surface where the object was previously detected as being in contact with or in proximity to the detection surface and at which the object is no longer detected as being in contact with or in proximity to the detection surface, and while the object is moving along the detection surface in the state in which the object is in contact with or in proximity to the detection surface, perform control to cause a third light emitter among the plurality of light emitters to emit light, wherein the third light emitter corresponds to a position in front of the contact or proximity point along the moving direction of the object along the detection surface where the object has not yet been detected as being in contact with or in proximity to the detection surface.

* * * * *